United States Patent
Son et al.

(10) Patent No.: US 8,605,327 B2
(45) Date of Patent: Dec. 10, 2013

(54) IMAGE FORMING APPARATUS AND COLOR CORRECTING METHOD THEREOF, AND HOST APPARATUS TO CORRECT THE COLOR OF AN OUTPUT IMAGE USING THE SAME

(75) Inventors: Chang-hwan Son, Suwon-si (KR); Kyeong-man Kim, Yongin-si (KR); Jung-ho Bang, Pocheon-si (KR); Yeong-ho Ha, Daegu (KR); In-su Jang, Daegu (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 508 days.

(21) Appl. No.: 12/750,943

(22) Filed: Mar. 31, 2010

(65) Prior Publication Data

US 2010/0290066 A1      Nov. 18, 2010

(30) Foreign Application Priority Data

May 18, 2009   (KR) .................. 10-2009-0043134

(51) Int. Cl.
*G06F 1/00* (2006.01)
*G06F 15/00* (2006.01)
*G09G 5/02* (2006.01)

(52) U.S. Cl.
USPC ............. 358/1.9; 345/601; 345/603; 345/604

(58) Field of Classification Search
None
See application file for complete search history.

(56) References Cited

U.S. PATENT DOCUMENTS

| | | | | |
|---|---|---|---|---|
| 5,081,529 A | * | 1/1992 | Collette | 358/504 |
| 5,563,725 A | * | 10/1996 | Kumada et al. | 358/518 |
| 5,675,717 A | * | 10/1997 | Yamamoto | 358/1.9 |
| 7,573,610 B2 | | 8/2009 | Um et al. | |
| 2003/0091230 A1 | * | 5/2003 | Choi et al. | 382/162 |
| 2004/0257598 A1 | * | 12/2004 | Fujio et al. | 358/1.9 |
| 2007/0052987 A1 | * | 3/2007 | Jung | 358/1.9 |
| 2007/0081177 A1 | | 4/2007 | Um et al. | |
| 2008/0084570 A1 | * | 4/2008 | Cho et al. | 358/1.9 |
| 2008/0100641 A1 | * | 5/2008 | Frederick et al. | 345/619 |

FOREIGN PATENT DOCUMENTS

KR   20070039431   4/2007

* cited by examiner

*Primary Examiner* — Marivelisse Santiago Cordero
*Assistant Examiner* — Moustapha Diaby
(74) *Attorney, Agent, or Firm* — Stanzione & Kim, LLP

(57) ABSTRACT

An image forming apparatus and a color correction method, and a host apparatus to correct the color of an output image using the color correction method. The image forming apparatus can include a table correction unit to correct the color conversion table based on monitor information, and a color conversion unit to convert the input image into the output image using the corrected color conversion table. Accordingly, the color of a displayed image can match that of a print output regardless of the status of the display apparatus.

24 Claims, 6 Drawing Sheets

IMAGE FORMING APPARATUS AND COLOR CORRECTING METHOD THEREOF, AND HOST APPARATUS TO CORRECT THE COLOR OF AN OUTPUT IMAGE USING THE SAME

CROSS-REFERENCE TO RELATED APPLICATIONS

This application claims priority under 35 U.S.C. §119 (a) from Korean Patent Application No. 10-2009-43134, filed on May 18, 2009, in the Korean Intellectual Property Office, the disclosure of which is incorporated herein by reference in its entirety.

BACKGROUND

1. Field of the Invention

The present general inventive concept relates to an image forming apparatus and a color correcting method thereof, and a host apparatus to correct the color of an output image using the same, and more particularly, to an image forming apparatus to correct a color conversion table based on monitor information and a color correcting method thereof, and a host apparatus to correct the color of an output image using the same.

2. Description of the Related Art

In order to print a red, green, blue (RGB) image, a printing apparatus requires a process of converting the RGB image into a cyan, magenta, yellow, black (CMYK) image. Most of the printing apparatuses use a pre-stored color conversion table to covert a RGB image into a CMYK image.

A user can check the color of a RGB image to be printed by viewing the RGB image displayed on a monitor. A conventional technique of converting a RGB image into a CMYK image uses a color conversion table, which is pre-stored for the purpose of converting standard RGB (sRGB), which is based on the characteristic of a cathode ray tube (CRT) monitor, into CMYK, and achieves correct color matching between the monitor and the printing apparatus. That is, in the case of a CRT monitor, a RGB image displayed on the CRT monitor matches a CMYK image output through the printing apparatus.

However, in recent years, a liquid crystal display (LCD) monitor is being used more than the CRT monitor. Therefore, when the conventional technique of converting a RGB image into a CMYK image is applied to the LCD monitor, correct color matching between the LCD monitor and the printing apparatus cannot be achieved.

FIG. 1 is a view illustrating a color gamut in the CIExy chromaticity coordinates according to a type of monitor.

Referring to FIG. 1, a monitor expressed by sRGB has the characteristic of a CRT monitor, which has a brightness of 80 cd/m² and a white point chromaticity of a light source D65 (Daylight, 6,500K).

As illustrated in FIG. 1, the color gamut of a CRT monitor is different from that of a LCD monitor, such as a cold cathode fluorescent lamp (CCFL) LCD 1, CCFL LCD 2, and a light emitting diode (LED) LCD. Also, the LCD monitors show different color gamuts depending on their types. This means that the CRT monitor and the LCD monitor displays different colors for the same image.

Since a conventional printing apparatus uses a color conversion table which is prepared to match the color with the color of the CRT monitor, the conventional printing apparatus cannot reproduce the color which matches the color of an image displayed on the LCD monitor when converting a RGB image into a CMYK image. That is, since the conventional printing apparatus uses a color conversion table for converting sRGB into CMYK, it cannot reproduce the color which matches the color of an image displayed on the LCD monitor.

Also, since the setting environment such as contrast, color temperature, and brightness of the monitor may be changed according to user's preference, a problem of mismatching between the RGB image displayed on the monitor and the CMYK image printed by the printing apparatus becomes more serious.

SUMMARY

Example embodiments of the present general inventive concept provide an image forming apparatus to correct a color conversion table based on monitor information, thereby matching the colors between a displayed input image and an output image, and a color correcting method thereof, and a host apparatus to correct the color of an output image using the same Additional embodiments of the present general inventive concept will be set forth in part in the description which follows and, in part, will be obvious from the description, or may be learned by practice of the general inventive concept.

Example embodiments of the present general inventive concept may be achieved by providing an image forming apparatus which stores a color conversion table therein to convert an input image into an output image, the image forming apparatus including a table correction unit to correct the color conversion table based on monitor information, and a color conversion unit to convert the input image into the output image using the corrected color conversion table.

The monitor information may include at least one of a type of monitor, color temperature information of the monitor, brightness information of the monitor, and contrast information of the monitor.

The image forming apparatus may further include an interface unit to receive the monitor information from a host apparatus which is connected to the image forming apparatus.

The monitor information may be one of information which is input through a printer driver of the host apparatus and information which is automatically recognized by the host apparatus.

The image forming apparatus may further include a panel manipulation unit to receive the monitor information.

The table correction unit may generate an international color consortium (ICC) profile reflecting the monitor information, convert RGB data of the input image into standard RGB (sRGB) data using the generated ICC profile, convert the sRGB data into CMYK data using the stored color conversion table, and correct the color conversion table so as to convert the sRGB data into the CMYK data.

Example embodiments of the present general inventive concept may also be achieved by providing a color correcting method of an image forming apparatus which stores a color conversion table therein to convert an input image into an output image, the color correcting method including correcting the color conversion table based on monitor information, and converting the input image into the output image using the corrected color conversion table.

The monitor information may include at least one of a type of monitor, color temperature information of the monitor, brightness information of the monitor, and contrast information of the monitor.

The color correcting method may further include receiving the monitor information.

The receiving the monitor information may include receiving the monitor information from a host apparatus which is connected to the image forming apparatus.

The monitor information may be one of information which is input through a printer driver of the host apparatus and information which is automatically recognized by the host apparatus.

The correcting may include generating an ICC profile reflecting the monitor information, converting RGB data of the input image into sRGB data using the generated ICC profile, converting the sRGB data into CMYK data using the color conversion table, and correcting the color conversion table so as to convert the sRGB data into the CMYK data.

Example embodiments of the present general inventive concept may also be achieved by providing a host apparatus to correct a color of an output image, including a printer driver unit to provide a user interface (UI) to receive monitor information, a video driver unit to provide the UI to a display apparatus to display the UI, and an input unit to receive the monitor information through the UI which is displayed on the display apparatus, wherein the printer driver unit provides the monitor information input through the input unit to an image forming apparatus.

The monitor information may include at least one of a type of monitor, color temperature information of the monitor, brightness information of the monitor, and contrast information of the monitor.

The user interface may include an input area of the monitor information and a preview providing area for an input image.

The preview providing area may include an original input image preview, a preview for an output image before color conversion, and a preview for an output image after color conversion.

Example embodiments of the present general inventive concept may also be achieved by providing a host apparatus to correct a color of an output image, including a video driver unit to load monitor information from a display apparatus, and a printer driver unit to provide the loaded monitor information to an image forming apparatus.

The monitor information may include at least one of a type of monitor, color temperature information of the monitor, brightness information of the monitor, and contrast information of the monitor.

The host apparatus may further include an input unit to receive an auto recognition request signal for the monitor information, and the video driver unit may load the monitor information, if the auto recognition request signal is input through the input unit.

The video driver unit may load the monitor information on a real time basis, if there is a change in the monitor information.

Example embodiments of the present general inventive concept may also be achieved by providing a host apparatus to correct color of an output image, including a video driver unit to load monitor information from a display apparatus, a printer driver unit to provide the loaded monitor information to an image forming apparatus, and an input unit to receive the monitor information through a user interface (UI) which is displayed on the display apparatus, wherein the printer driver unit provides the monitor information input through the input unit to an image forming apparatus.

Example embodiments of the present general inventive concept may also be achieved by providing a method of adjusting color information of an image forming apparatus, including receiving monitor information about a display apparatus connectable to the image forming apparatus, adjusting a color conversion table of the image forming apparatus according to the monitor information, and generating an output image using the adjusted color conversion table.

The color display status of the input image can be configured to match the color printing status of the output image.

The method may further include displaying the converted output image on the display apparatus according to the adjusted color conversion table, and printing the converted output image according to the adjusted color conversion table.

Example embodiments of the present general inventive concept may also be achieved by providing a method of correcting color of an image in a host apparatus, including generating a user interface (UI) including a monitor information input area to set monitor information and a preview area to preview images according to the set monitor information, and converting the image according to the set monitor information.

BRIEF DESCRIPTION OF THE DRAWINGS

These and/or other embodiments of the present general inventive concept will become apparent and more readily appreciated from the following description of the embodiments, taken in conjunction with the accompanying drawings of which.

DETAILED DESCRIPTION OF THE EMBODIMENTS

Figure 1:
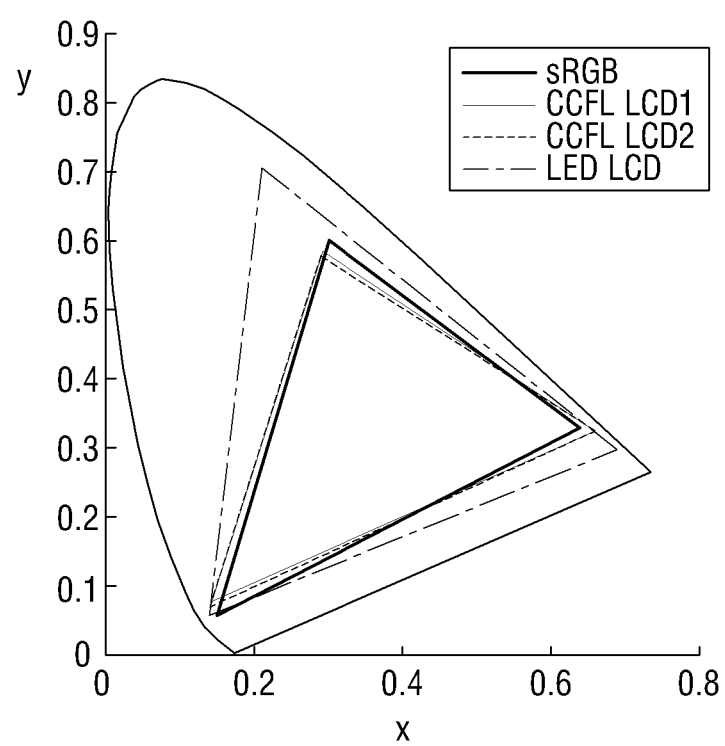
FIG. 1 is a view illustrating a color gamut in the standard CIExy chromaticity coordinates according to a type of monitor.

Reference will now be made in detail to the embodiments of the present general inventive concept, examples of which are illustrated in the accompanying drawings, wherein like reference numerals refer to like elements throughout. The embodiments are described below in order to explain the present general inventive concept by referring to the figures FIG. 2 is a block diagram illustrating a color correcting system according to an exemplary embodiment of the present general inventive concept.

Figure 2:
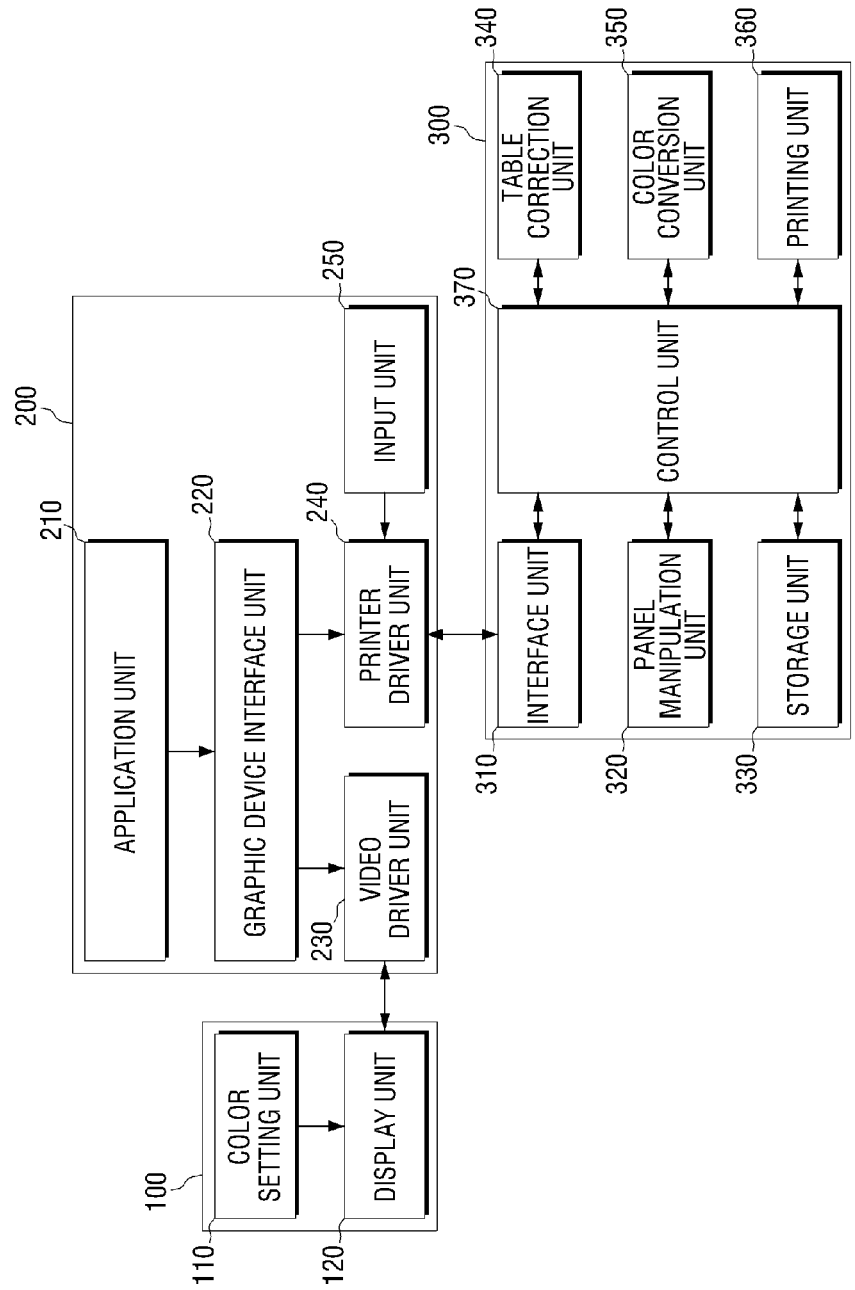
FIG. 2 is a block diagram illustrating a color correcting system according to an exemplary embodiment of the present general inventive concept.

Referring to FIG. 2, the color correcting system includes a display apparatus 100, a host apparatus 200, and an image forming apparatus 300. The display apparatus 100 and the image forming apparatus 300 are connected to the host apparatus 200 in a wired or wireless manner to perform wired or wireless communication to and from the host apparatus 200.

The display apparatus 100 includes a color setting unit 110 and a display unit 120 to display an image provided from the video driver unit 230 of the host apparatus 200.

The color setting unit 110 is a menu input terminal through which a user changes monitor information which has been previously set. That is, the user can generate a user input signal to through the color setting unit 110 to adjust the status of a screen on which an image is displayed. The monitor information set through the color setting unit 110 can include at least one of a type of monitor, color temperature formation of the monitor, brightness information of the monitor, and contrast information of the monitor, although other forms of monitor information could also be included and set according to the user input signal without departing from the principles and spirit of the present general inventive concept.

The display unit 120 displays an image provided from the video driver unit 230 of the host apparatus 200 according to the monitor information set by the color setting unit 110.

As illustrated in FIG. 2, the host apparatus 200 includes an application unit 210, a graphic device interface unit 220, a video driver unit 230, a printer driver unit 240, and an input unit 250.

By way of example and not by way of limitation, the application unit 210 stores a program which is installed for a user to process a job for document, graphic, and motion picture. The user processes a job for document, graphic, and motion picture through the application unit 210 and then manipulates the application unit 210 to perform printing operation.

Here, the graphic device interface unit 220 is implemented in the form of a program to control the hardware of an input and output device, and to support the interface between the application unit 210 and the video driver unit 230 or the printer driver unit 240.

The video driver unit 230 supports the interface between the host apparatus 200 and the display apparatus 100, and transmits data provided from the graphic device interface unit 220 to the display apparatus 100.

As illustrated in FIG. 2, the video driver unit 230 communicates with the display unit 120 to receive and store (i.e., load) the monitor information set from the color setting unit 110 of the display apparatus 100 if there is a request to do so from a user, or if there is a change in the monitor information. Accordingly, the monitor information regarding the current environment setting status of the display apparatus 100 is reflected when the color of an output image is corrected, without requiring the user to input the monitor information directly.

More specifically, the video driver unit 230 receives the monitor information from the display apparatus 100 if an auto recognition request signal for the monitor information is input through the input unit 250. This occurs if there is a request from the user to reflect the monitor information when the color is corrected Also, the video driver unit 230 monitors the display apparatus 100 on a real time basis to determine whether there is a change in the monitor information or not. If there is a change in the monitor information, the video driver unit 230 receives the changed monitor information on a real time basis regardless of whether there is a request from the user or not. Accordingly, the changed monitor information can be reflected on a real time basis when the color of an output image is corrected.

The printer driver unit 240 communicates with the interface unit 310 to provide an interface between the host apparatus 200 and the image forming apparatus 300, and converts data provided from the graphic device interface unit 220 into a language which is readable by the image forming apparatus 200 and transmits the language to the image forming apparatus 300.

If the user manipulates the application unit 210 to control a printing operation of the image forming apparatus 300, the printer driver unit 240 provides a user interface (UI) so as to generate a user input signal to manipulate the image forming apparatus 300 to perform the printing operation.

The printer driver unit 240 further provides a monitor environment setting UI to receive monitor information automatically or through a user input signal. The monitor environment setting UI will be described below with reference to FIG. 3. The UI's provided by the printer driver unit 240 are provided to the display apparatus 100 through the graphic device interface unit 220 and the video driver unit 230 such that they are displayed on the display unit 120.

For example, if the user wishes to input the monitor information directly, the input unit 250 receives the monitor information through the monitor environment setting UI provided by the printer driver unit 240. Also, the input unit 250 receives the auto recognition request signal for the monitor information if the user wishes the monitor information to be automatically recognized without inputting the monitor information directly.

It is possible that the display apparatus 100 can be formed with the host apparatus 200 in a single body, and it is possible that the display apparatus 100 can be formed with the image forming apparatus 300 in a single body. However, it is possible that other combinations and/or sub-combinations of the display apparatus 100, host apparatus 200, and image forming apparatus 300 as single or multiple bodies could also be used without departing from the principles and spirit of the present general inventive concept.

Referring back to FIG. 2, the image forming apparatus 300 includes an interface unit 310, a panel manipulation unit 320, a storage unit 330, a table correction unit 340, a color conversion unit 350, a printing unit 360, and a control unit 370.

The interface unit 310 provides an interface between the host apparatus 200 and the image forming apparatus 300 and receives the monitor information from the host apparatus 200. The monitor information input from the host apparatus 200 may be information that is input to the host apparatus 200 from the user or information that is automatically recognized by the host apparatus 200.

The panel manipulation unit 320 is provided on a front panel of the image forming apparatus 300, and includes a plurality of function keys (not illustrated) to receive a predetermined request signal from the user or includes a menu key (not illustrated) in the form of a touch panel. Accordingly, the panel manipulation unit 320 receives the monitor information from the user. When the display apparatus 100 is formed with the image forming apparatus as a single body, the panel manipulation unit 320 may be included in a portion of the display unit 120.

The storage unit 330 may store diverse information to operate the image forming apparatus 300. In this example embodiment, the storage unit 330 stores a color conversion table to convert an input image into an output image.

The table correction unit 340 corrects the color conversion table stored in the storage unit 330 based on the monitor information. The monitor information may be input from the user through the panel manipulation unit 320 or may be input from the host apparatus 200 connected to the image forming apparatus 300.

More specifically, the table correction unit 340 generates an international color consortium (ICC) profile reflecting the monitor information, and converts RGB data of an input image into sRGB data using the generated ICC profile, converts the sRGB data into CMYK data using the color conversion table stored in the storage unit 330, and corrects the color conversion table so as to convert the sRGB data into the CMYK data.

The ICC profile is provided by the international standard consortium for the purpose of reproducing the inherent color of an original image on an input and output device, regardless of the color reproduction characteristic of the input and output device and the application of image conversion. The ICC profile is a digital file which defines a relationship between a device-dependent color space and a device-independent color space using a mathematical modeling or a lookup table.

The device-dependent color space refers to color coordinates in which a digital control signal value is expressed by a predetermined bit, such as 8 bit or 10 bit, to quantitatively define the color represented by the input and output device. The RGB, CMY, CMYK color spaces are mainly used as the device-independent color space, depending on the color reproducing method of an output device and the number of primary colors. As the device-dependent color space expresses the color of the input and output device simply by combined digital control signal values, it cannot reflect the inherent color that is reproduced by the device. Also, if an image having the same color value in the device-dependent color space is output through output devices which differ from each other in their color reproduction characteristics, the color of the output image is differently displayed.

For example, monitor information characterizing the display apparatus 100 can be set through the monitor environment setting UI of the graphic device interface unit 220. Then, the table correction unit 340 of the image forming apparatus 300 can be used to adjust a color conversion table stored in the storage unit 330 according to the monitor information to adjust the color space (i.e., color coordinates) of an input image to reflect the characteristics of the display apparatus 100. Similar methods can be used to match the color coordinates of the output image to the color characteristics of other output devices, such as printers.

The device-independent color space refers to color coordinates in which a color stimulus value that can be recognized by human visibility is quantitatively expressed, and reflects the same color value regardless of the color reproduction characteristic of an output device. Representative examples of the device-independent color space are sRGB, CIEXYZ, CIELAB, although the present general inventive concept is not limited thereto.

The ICC profile may be generated through software related to measurement equipment such as colorimeters or spectroradiometers. However, in the example embodiments of the present general inventive concept, the ICC profile is easily generated by inputting monitor information through the monitor environment setting UI which is provided by the printer driver unit 240 of the host apparatus 200. The monitor environment setting UI will be described in detail with reference to FIG. 3 below.

Referring again to FIG. 2, the color conversion unit 350 converts the digital control signal representing an input image into another digital control signal representing an output image using the color conversion table stored in the storage unit 330. If the color conversion table has been adjusted or corrected by the table correction unit 340 to reflect the color characteristics of a particular output device, the color conversion unit 350 converts the input image (e.g., RGB image) into the output image (e.g., CMYK image) using the corrected color conversion table.

The printing unit 360 performs printing operation with respect to the output image which has been converted by the color conversion unit 350.

The control unit 370 controls entire functions of the image forming apparatus 300. That is, the control unit 370 controls signal input and output among the interface unit 310, the panel manipulation unit 320, the storage unit 330, the table correction unit 340, the color conversion unit 350, and the printing unit 360.

Furthermore, the input image may be subjected to rendering and half-toning processes. However, such rendering and half-toning processes are well known in the related art and thus are not illustrated herein.

Figure 3:
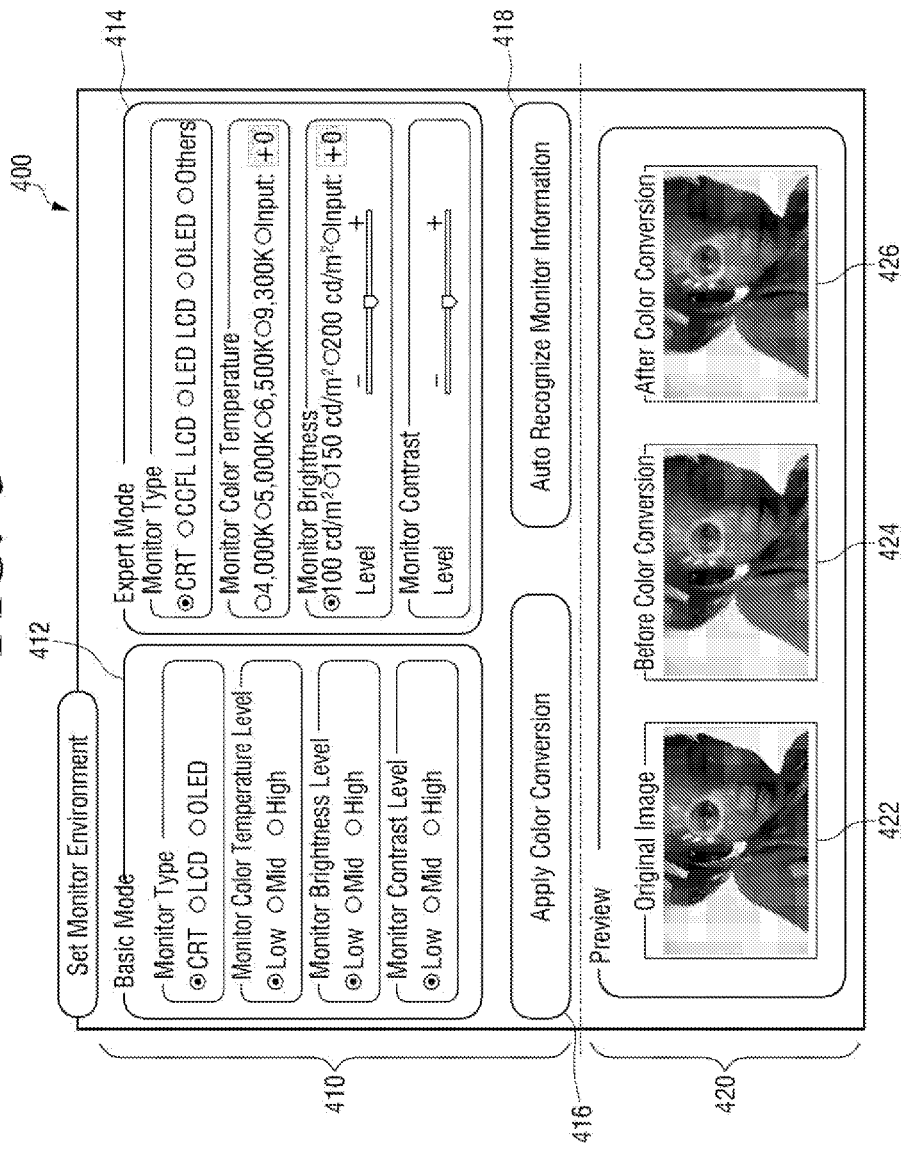
FIG. 3 is a view illustrating a monitor environment setting user interface (UI) which is provided by a host apparatus according to an exemplary embodiment of the present general inventive concept.

FIG. 3 is a view illustrating an example monitor environment setting UI provided by the host apparatus 200 according to an exemplary embodiment of the present general inventive concept.

Referring to FIG. 3, the example monitor environment setting UI (400) can be provided by the printer driver unit 240 of the host apparatus 200. The monitor environment setting UI 400 may include a monitor information input area 410 and a preview providing area 420 for an input image. It is possible that the UI 400 may be displayed, for example, on the display unit 120 of the display apparatus and/or the panel manipulation unit 320 of the image forming apparatus 300 to receive a user's input.

As illustrated in FIG. 3, the monitor information input area 410, which receives monitor information from the user, is divided into a basic mode 412 and an expert mode 414. The basic mode 412 is prepared for a general user and displays a monitor type, a monitor color temperature level, a monitor brightness level, and a monitor contrast level in a simple pattern. The expert mode 414 is prepared for a user who has the expertise about the display apparatus 100 and displays a monitor type, a monitor color temperature level, a monitor brightness level, and a monitor contrast level in detail or with numerical values. The monitor information can be stored in a memory of display apparatus 100 or host apparatus 200, or in the storage unit 330 of the image forming apparatus 300.

The monitor information input area 410 may further include a color conversion application button 416 and a monitor information auto recognition button 418. After inputting monitor information through the monitor information input area 410, the user inputs a command to correct the color conversion table using the color conversion application button 416.

The monitor information auto recognition button 418 is used when the user wishes the host apparatus 200 to automatically recognize monitor information without directly inputting the monitor information through the monitor information input area 410. If the user clicks the monitor information auto recognition button 418, the printer driver unit 240 senses the click and checks the environment setting status of the display apparatus 100 through the graphic device interface unit 220 and the video driver unit 230, thereby automatically recognizing the monitor information.

The preview providing area 420 provides an original input image preview 422, a pre-color conversion output image preview 424, and a post-color conversion output image preview 426.

The original input image preview 422 illustrates an input image displayed on the display apparatus 100, the pre-color conversion output image preview 424 illustrates an output image which is converted from the input image using an original color conversion table, and the post-color conversion output image preview 426 illustrates an output image which is converted from the input image using the color conversion table which has been corrected by the table correction unit 340.

The monitor environment setting UI 400 illustrated in FIG. 3 is merely an example of a UI to receive the monitor information, and the specific shape, configuration, and/or format of the UI is not limited thereto. For example, it is possible that the UI may be changed in accordance with a user's convenience to receive the monitor information.

Figure 4:
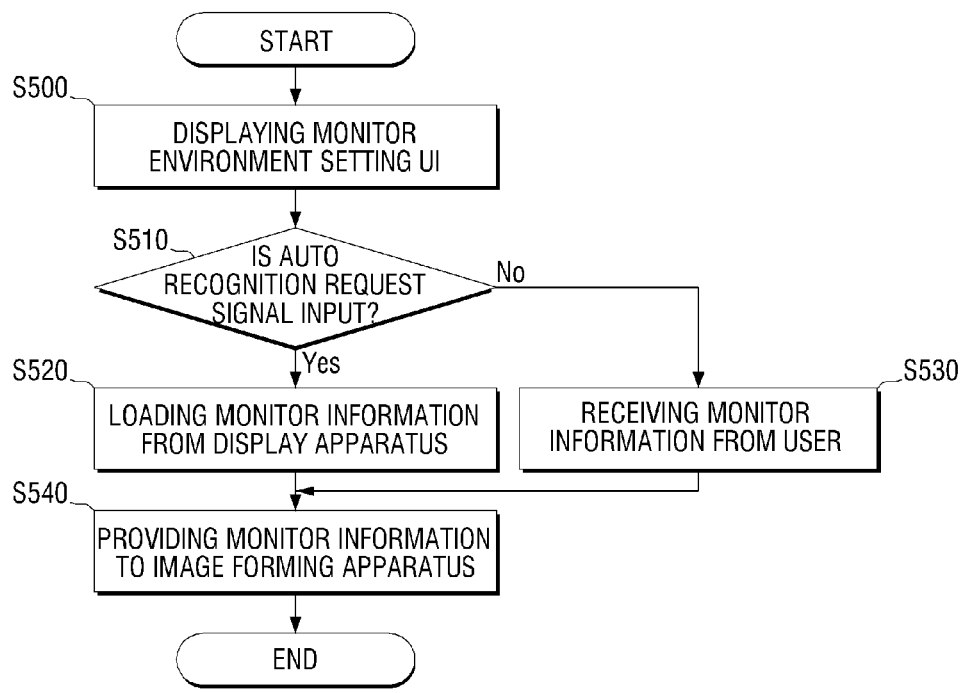
FIG. 4 is a flowchart illustrating an operating method of a host apparatus according to an exemplary embodiment of the present general inventive concept.

FIG. 4 is a flowchart illustrating an operating method of the host apparatus according to an exemplary embodiment of the present general inventive concept.

A procedure in which the host apparatus 200 receives or automatically recognizes the monitor information will be described with reference to FIGS. 2 to 4.

As illustrated in FIG. 3, the printer driver unit 240 generates the monitor environment setting UI 400 and the monitor environment setting UI 400 is displayed on the display unit 120 of the display apparatus 100 in operation S500.

The user may directly input monitor information through the monitor environment setting UI 400 or may manipulate the host apparatus 200 to automatically recognize the monitor information. The printer driver unit 240 then determines whether an auto recognition request signal is input or not in operation S510.

If an auto recognition request signal is input in operation S510, the printer driver unit 240 recognizes the environment setting status of the display apparatus 100 through the graphic device interface unit 220 and the video driver unit 230 and loads the monitor information in operation S520.

If no auto recognition request signal is input in operation S510, the monitor information is directly input by the user in operation S530. In this case, the user can select one of the basic mode 412 and the expert mode 414 to input the monitor information.

In operation S540, the printer driver unit 240 provides the monitor information which is loaded from the display apparatus 100 or the monitor information which is input through the monitor environment setting UI 400 to the image forming apparatus 300.

Figure 5:
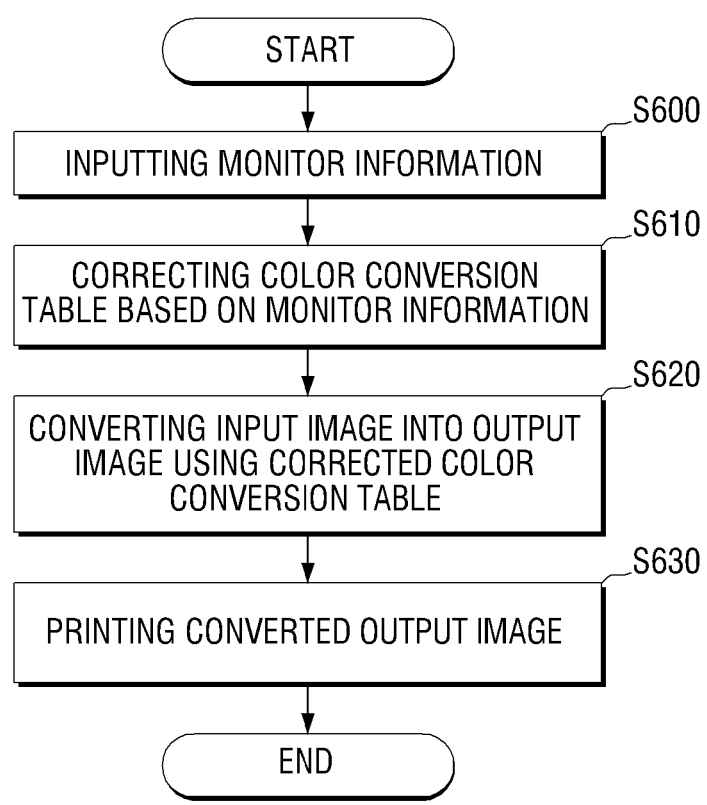
FIG. 5 is a flowchart illustrating a color correcting method of an image forming apparatus according to an exemplary embodiment of the present general inventive concept.

FIG. 5 is a flowchart illustrating a color correcting method of the image forming apparatus according to an exemplary embodiment of the present general inventive concept.

Referring to FIGS. 2 to 5, a procedure in which the image forming apparatus 300 corrects color based on monitor information will be explained.

In operation S600, the image forming apparatus 300 receives monitor information. The monitor information may be input through the panel manipulation unit 320 or the host apparatus 200. The monitor information input through the host apparatus 200 may be input by the user through the monitor environment setting UI 400 or may be automatically recognized by the host apparatus 200.

In either case, in operation S610, when the monitor information is input, the table correction unit 340 corrects the original color conversion table stored in the storage unit 330 based on the received monitor information. In operation S620, the color conversion unit 350 converts the digital control signal representing an input image into another digital control signal representing an output image using the color conversion table which has been corrected by the table correction unit 340. Then, the printing unit 360 performs a printing operation with respect to the converted output image in operation S630.

Figure 6:
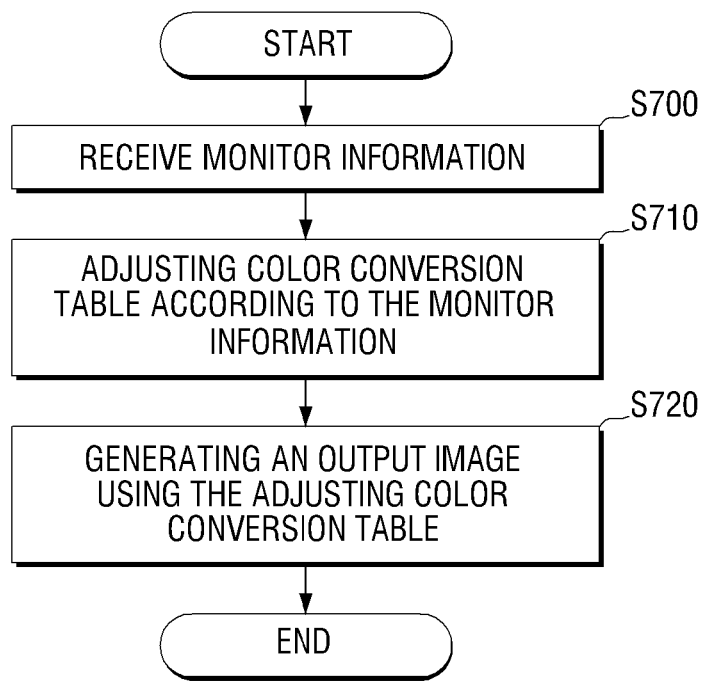
FIG. 6 is a flowchart illustrating a color correcting method of an image forming apparatus according to another exemplary embodiment of the present general inventive concept.

FIG. 6 is a flowchart illustrating a color correcting method of the image forming apparatus according to another exemplary embodiment of the present general inventive concept.

In operation S700, the image forming apparatus 300 receives monitor information of a display monitor connectable to the image forming apparatus. As described above, the monitor information may be input through the panel manipulation unit 320 or the host apparatus 200. For example, the monitor information input through the host apparatus 200 may be input by the user through the monitor environment setting UI 400 or may be automatically recognized by the host apparatus 200.

In operation S710, when the monitor information is received, the table correction unit 340 adjusts the original color conversion table according to the received monitor information.

In operation S720, the image forming apparatus generates an output image using the adjusted color conversion table. The image forming apparatus can then perform an output operation to display and print the output image according to adjusted color conversion table.

As described above, since the original color conversion table is corrected based on the monitor information, the display status of the input image matches the printing status of the output image regardless of the type of the display apparatus 100 and the environment setting status.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various example embodiments of the present general inventive concept have been illustrated and described, it will be appreciated by those skilled in the art that changes may be made in these example embodiments without departing from the principles and spirit of the general inventive concept, the scope of which is defined in the appended claims and their equivalents.

What is claimed is:

1. An image forming apparatus which stores a color conversion table therein to convert an input image into an output image, the image forming apparatus comprising:
    a table correction unit configured to correct the color conversion table based on monitor information; and
    a color conversion unit configured to convert the input image into the output image using the corrected color conversion table,
    wherein the table correction unit generates an international color consortium (ICC) profile reflecting the monitor information, converts RGB data of the input image into standard RGB (sRGB) data using the generated ICC profile, converts the sRGB data into CMYK data using the stored color conversion table, and corrects the color conversion table so as to convert the sRGB data into the CMYK data.

2. The image forming apparatus of claim 1, wherein the monitor information comprises at least one of a type of monitor, color temperature information of the monitor, brightness information of the monitor, and contrast information of the monitor.

3. The image forming apparatus of claim 1, further comprising:
an interface unit to receive the monitor information from a host apparatus which is connected to the image forming apparatus.

4. The image forming apparatus of claim 3, wherein the monitor information is one of information which is input through a printer driver of the host apparatus and information which is automatically recognized by the host apparatus.

5. The image forming apparatus of claim 1, further comprising:
a panel manipulation unit to receive the monitor information.

6. The image forming apparatus of claim 1, wherein the color conversion table is corrected by adjusting a preexisting color conversion table in the image forming apparatus.

7. The image forming apparatus of claim 1, wherein the table correction unit generates a profile to define a relationship between a device-dependent color space and a device-independent color space.

8. A color correcting method of an image forming apparatus which stores a color conversion table therein to convert an input image into an output image, the color correcting method comprising:
correcting the color conversion table based on monitor information by:
generating an international color consortium (ICC) profile reflecting the monitor information;
converting RGB data of the input image into sRGB data using the generated ICC profile;
converting the sRGB data into CMYK data using the color conversion table; and
correcting the color conversion table so as to convert the sRGB data into the CMYK data; and
converting the input image into the output image using the corrected color conversion table.

9. The color correcting method of claim 8, wherein the monitor information comprises at least one of a type of monitor, color temperature information of the monitor, brightness information of the monitor, and contrast information of the monitor.

10. The color correcting method of claim 8, further comprising:
receiving the monitor information.

11. The color correcting method of claim 10, wherein the receiving the monitor information comprises receiving the monitor information from a host apparatus which is connected to the image forming apparatus.

12. The color correcting method of claim 11, wherein the monitor information is one of information which is input through a printer driver of the host apparatus and information which is automatically recognized by the host apparatus.

13. A host apparatus to correct color of an output image, comprising:
a printer driver unit configured to provide a user interface (UI) to receive monitor information;
a video driver unit configured to provide the UI to a display apparatus to display the UI; and
an input unit configured to receive the monitor information through the UI which is displayed on the display apparatus,
wherein the printer driver unit provides the monitor information input through the input unit to an image forming apparatus, which generates an international color consortium (ICC) profile reflecting the monitor information, converts RGB data of the input image into standard RGB (sRGB) data using the generated ICC profile, converts the sRGB data into CMYK data using the stored color conversion table, and corrects the color conversion table so as to convert the sRGB data into the CMYK data.

14. The host apparatus of claim 13, wherein the monitor information comprises at least one of a type of monitor, color temperature information of the monitor, brightness information of the monitor, and contrast information of the monitor.

15. The host apparatus of claim 13, wherein the user interface comprises an input area of the monitor information and a preview providing area for an input image.

16. The host apparatus of claim 15, wherein the preview providing area comprises an original input image preview, a preview for an output image before color conversion, and a preview for an output image after color conversion.

17. A host apparatus to correct color of an output image, comprising:
a video driver unit configured to automatically load monitor information from a display apparatus to set the loaded monitor information when a condition for monitor information reception is satisfied;
a printer driver unit configured to provide the loaded monitor information to an image forming apparatus to generate an international color consortium (ICC) profile reflecting the monitor information, convert RGB data of the input image into standard RGB (sRGB) data using the generated ICC profile, convert the sRGB data into CMYK data using the stored color conversion table, and correct the color conversion table so as to convert the sRGB data into the CMYK data; and
an input unit to receive an auto recognition request signal for the monitor information,
wherein the video driver unit loads the monitor information, if the auto recognition request signal is input through the input unit.

18. The host apparatus of claim 17, wherein the monitor information comprises at least one of a type of monitor, color temperature information of the monitor, brightness information of the monitor, and contrast information of the monitor.

19. The host apparatus of claim 17, wherein the video driver unit loads the monitor information on a real time basis, if there is a change in the monitor information.

20. A host apparatus to correct color of an output image, comprising:
a video driver unit configured to load monitor information from a display apparatus;
a printer driver unit configured to provide the loaded monitor information to an image forming apparatus to generate an international color consortium (ICC) profile reflecting the monitor information, convert RGB data of the input image into standard RGB (sRGB) data using the generated ICC profile, convert the sRGB data into CMYK data using the stored color conversion table, and correct the color conversion table so as to convert the sRGB data into the CMYK data; and
an input unit configured to receive the monitor information through a user interface (UI) which is displayed on the display apparatus,
wherein the printer driver unit provides the monitor information input through the input unit to an image forming apparatus.

21. A method of adjusting color information of an image forming apparatus which stores a color conversion table therein to convert an input image into an output image, comprising:
    receiving monitor information about a display apparatus connectable to the image forming apparatus;
    adjusting the color conversion table of the image forming apparatus according to the monitor information by:
        generating an international color consortium (ICC) profile reflecting the monitor information;
        converting RGB data of the input image into sRGB data using the generated ICC profile;
        converting the sRGB data into CMYK data using the color conversion table; and
        correcting the color conversion table so as to convert the sRGB data into the CMYK data;
    generating an output image using the adjusted color conversion table; and
    printing the output image on a printing media.

22. The method of claim 21, wherein a color display status of the output image matches a color printing status of the output image.

23. The method of claim 21, further comprising:
    displaying the output image on the display apparatus according to the adjusted color conversion table; and
    printing the output image according to the adjusted color conversion table.

24. A method of correcting color of an image in a host apparatus and an image forming apparatus, comprising:
    generating a user interface (UI) including a monitor information input area to set monitor information and a preview area to provide preview images according to the set monitor information, the preview images including an original input image preview, a pre-color conversion output image preview, and a post-color conversion output image preview;
    adjusting a color conversion table of the image forming apparatus according to the monitor information by generating an international color consortium (ICC) profile reflecting the monitor information, converting RGB data of the input image into sRGB data using the generated ICC profile, converting the sRGB data into CMYK data using the color conversion table, and correcting the color conversion table so as to convert the sRGB data into the CMYK data; and
    converting the image according to the set monitor information,
    wherein the preview images comprise an output image of the image forming apparatus.

* * * * *